United States Patent
Cohen et al.

(10) Patent No.: US 7,184,602 B2
(45) Date of Patent: Feb. 27, 2007

(54) SYSTEM AND METHOD FOR LOW BANDWIDTH VIDEO STREAMING FOR FACE-TO-FACE TELECONFERENCING

(75) Inventors: Michael Cohen, Seattle, WA (US); Zicheng Liu, Bellevue, WA (US); Zhen Wen, Urbana, IL (US); Ke Zheng, Seattle, WA (US)

(73) Assignee: Microsoft Corp., Redmond, WA (US)

( * ) Notice: Subject to any disclaimer, the term of this patent is extended or adjusted under 35 U.S.C. 154(b) by 886 days.

(21) Appl. No.: 10/428,989

(22) Filed: May 2, 2003

(65) Prior Publication Data

US 2004/0218827 A1 Nov. 4, 2004

(51) Int. Cl.
*G06K 9/36* (2006.01)

(52) U.S. Cl. ...................................... 382/243

(58) Field of Classification Search ............. 348/14.12, 348/14.15; 382/243, 181, 224, 118, 276; 345/419
See application file for complete search history.

(56) References Cited

U.S. PATENT DOCUMENTS

| | | | | |
|---|---|---|---|---|
| 6,879,709 B2 * | 4/2005 | Tian et al. | ................... | 382/118 |
| 6,944,318 B1 * | 9/2005 | Takata et al. | ................ | 382/115 |
| 2002/0113862 A1 * | 8/2002 | Center et al. | ............ | 348/14.08 |

OTHER PUBLICATIONS

Rapid Modeling of Animated Faces From Video; Zicheng Liu,Zhenyou Zhang,Chuck Jacobs,Michael Cohen;Microsoft Research Feb. 28, 2000.*

Real Time Speech Driven Face Animation with expression using Neutral Netwroks, Pengyu Hong,Zhen Wen, and Thomas S.Huang; 2002 IEEE.*

Multi-Modal Tracking of Faces for video Communications, James Crowley and Froincois Berard, 1997 IEEE.*

Real-Time Face Detecting Using Boosting in Hierarchical feature Spaces, Dhong Zhang and Daniel Gatica-Perez; Proceeding of the 17th International Conference on Pattern Recognition (ICPR'04),IEEE.*

Face Tracking and Coding for Video Compression; William E.Vieux, Karl Schwerdt and James L.Crowley, Springer-Verlag Berlin Heidelberg 1999.*

Feature-Based Image Metamorphis; Thaddeus Beier, Shawn Neely; 1992.*

(Continued)

*Primary Examiner*—Joseph Mancuso
*Assistant Examiner*—Nancy Bitar
(74) *Attorney, Agent, or Firm*—Lyon & Harr, LLP; Katrina A. Lyon

(57) ABSTRACT

A system and method for facilitating low bandwidth video image transmission in video conferencing systems. A target is acquired (video image of a person's head) and processed to identify one or more sub-regions (e.g., background, eyes, mouth and head). The invention incorporates a fast feature matching methodology to match a current sub-region with previously stored sub-regions. If a match is found, an instruction is sent to the receiving computer to generate the next frame of video data from the previously stored blocks utilizing a texture synthesis technique. The invention is applicable for video conferencing in low bandwidth environments.

34 Claims, 10 Drawing Sheets

OTHER PUBLICATIONS

Crow, Franklin. Summed-area tables for texture mapping. Proceedings of SIGGRAPH '84,Computer Graphics vol. 18, No. 3, Jul. 1984, pp. 207-212.

Voila, P. and Jones, M. Robust real-time object detection. International Workshop on statistical and computational theories of vision, 2001. pp. 1-25.

Weigand, T. Study of Final Committee Draft of Joint Video Specification (ITU-T REC. H.264 ISO/IEC 14496-10 AVC), Feb. 16, 2003, pp. 1-226.

Weigand, T, Zhang, X. and Girod, B. Long-term memory motion-compensated prediction. IEEE Transactions of Circuits and Systems for Video Technology, vol. 9A., No. 1, Feb. 1999.

* cited by examiner

SYSTEM AND METHOD FOR LOW BANDWIDTH VIDEO STREAMING FOR FACE-TO-FACE TELECONFERENCING

BACKGROUND

1. Technical Field

This invention is directed toward a system and method for very low bandwidth transmission of video imagery. More specifically, the invention is directed toward a system and method for very low bandwidth transmission of video imagery of faces that are talking.

2. Background Art

Voice only communication lacks many of the nuances of face-to-face communication. The most obvious lack is that of facial expressions. Video conferencing is aimed to overcoming this, but is hampered by the high bandwidth cost to achieve quality video image transmission. Due to this high bandwidth requirement, and its associated costs, current commercial video teleconference solutions are limited in their usage.

Meanwhile, much research has been done for low bit-rate face video coding. One class of method is model-based coding, such as the MPEG-4 face animation standard. In these methods, a facial image is coded as changes of face model parameters so that a very low bit-rate can be achieved. However, it is difficult to make the synthesized face model look natural and match the input video. Many existing model-based coding systems either use 3D face models or use principal component analysis. The drawback with using 3D modeling is that currently it is difficult to obtain a good 3D model, to track poses, and to generate facial expressions. The PCA approach also has a strong requirement for per-pixel alignment, necessary to avoid blurry images, which is difficult to obtain.

Compared to model-based techniques, traditional waveform based coding techniques (such as H.26X, MPEG-1/2/4, and so on) are fully automatic and robust. However, the quality of low bit-rate video is usually not sufficient to support these techniques. The computational complexity for a sophisticated waveform video coder, such as H.264, can also be very high.

It is noted that in the remainder of this specification, the description refers to various individual publications identified by a numeric designator contained within a pair of brackets. For example, such a reference may be identified by reciting, "reference [1]" or simply "[1]". A listing of the publications corresponding to each designator can be found at the end of the Detailed Description section.

SUMMARY

The invention, referred to herein as the low bandwidth video streaming system and method, is directed toward a system and method for very low bandwidth transmission of video imagery of a person speaking. It is assumed that the camera taking the images is static, that both sending and receiving devices have fast processing and large storage capacities, and that the conversation lasts for a period of time. A strategy employed in this low bandwidth video streaming system is to use images transmitted earlier in the conversation to aid in the transmission of the remaining video stream. The low bandwidth video streaming system and method of the invention also employs a fast feature matching methodology to match the current frame with previous similar frames. New images are then reconstructed through texture synthesis techniques from the similar frames. Initial results of one exemplary working embodiment of the invention point to the ability to transmit very high quality results at below slow (28.8 kb) modem speeds.

More specifically, the overall system and method of transmitting low bandwidth video according to the invention is described as follows. As each image enters the system from a camera, the system finds the face and determines a rectangular "Head Box" surrounding the face. The image is then divided into regional sub-image layers. These sub-image layers include the face inside the Head Box, a rectangular region encompassing the eyes, and a rectangular region encompassing the mouth set at predetermined positions based on predetermined ratios. The background outside the Head Box is also considered as a separate sub-image region layer. Each of the three regional sub-images Head (minus eyes and mouth), Eyes, and Mouth that are separate from the background are processed as separate layers from this point onward and are recomposited at the receiver end after transmission. The background layer outside of the face area is encoded only upon initialization and updated very infrequently since it is presumed not to change very often if at all.

Once the input image is divided into regional sub-image layers, each sub-image layer of the input image is then quickly compared to all previously saved sub-images, which are stored in a sender's reference frame database, based on features that were selected using a feature selection classifier. If a sub-image is determined to be new, it is added to a sender reference frame database and transmitted to a receiver (typically after encoding). The receiver saves the sub-image in its own reference frame database and optionally displays the sub-image.

If instead of finding that the image is new, one or more possible matches in the sender's reference frame database are found to the input image, these are forwarded to the synthesis module that uses a block-based texture synthesis methodology to construct an image closely resembling the original input image from blocks found in the closely matching sub-images from the sender's reference frame database. The coded instructions are then sent to the receiver for constructing the image closely resembling the original input image from its own database that matches the sender's. Optionally, if the synthesis module cannot match a particular block, the original block may also be added to the sender database and transmitted from the sender to the receiver to be added to the receiver's database.

When the receiver receives a message containing synthesis instructions, it decodes the instructions if necessary, extracts the blocks of images from the receiver reference database per the synthesis instructions, and then assembles the synthesized image. The assembled synthesized image is then displayed at the receiver.

As discussed above, given a face rectangle and associated eyes and mouth rectangles, the system determines for each component (face, eyes, mouth) if it is new. It is preferred that these determinations be very fast. One method employed in the low bandwidth video streaming system for comparing a new image to images in the existing databases uses a set of features that is defined by differences of rectangular regions in a summed area table also referred to as an integral image. For an image, I, with pixel $I_{uv}$, the corresponding pixel in the integral image $II_{uv}$ is equal to the sum of all pixels above (or below) and to the left (or right) of it. The integral image can be computed in a single pass through the image. It then allows the fast evaluation of the integral of any rectangle in the image by accessing and summing or differencing only four pixels. The score of a particular feature, F, applied to an image, a, is simply F(a)=the integral of the white (+) regions minus the integral of the black (−) regions. The low bandwidth streaming video system uses a classifier in a new manner to determine whether the current image (e.g., face or eyes or mouth) is sufficiently similar to an image previously stored in a database to be a candidate for the synthesis stage. This method cannot act on a single image alone (face vs. non-face), but must act on a pair of images to classify them as similar or non-similar. To do so, the score that a particular feature returns is altered to be the absolute difference between the unary feature scores on each of the pair of images under consideration, $F(a,b)=|F(a)-F(b)|.$ In addition, the classifier is trained automatically from video sequences. To do so, each pair of images is annotated as similar (or non-similar) based on the pixel luminance $L_2$ difference between them. More specifically, a sequence of training images is examined, and the $L_2$ difference between all pairs of images is annotated and recorded. The pairs of pixels are annotated to be similar (S=1) if they are at least $\alpha$ standard deviations less different than the mean difference:

$S(a,b)=1$ if $\|a-b\|_2<\mu-\alpha\sigma$, 0 otherwise where $\mu$ and $\sigma$ are the mean and standard deviation of the $L_2$ distances between all pairs of images in a sequence from a single person. Training sets from multiple people sitting and talking in front of a camera with different lighting conditions were captured. A different $\mu$ and $\sigma$ were determined for each person. A value of 1 was (somewhat arbitrarily) set for $\alpha$ after examining histograms of the aforementioned pixel luminance distances. Given a positive $\alpha$ one can (almost) be assured that most pairs will be marked as non-similar. This fact was used to construct an efficient classifier by training a cascade of classifiers, each of which is good at removing many non-similar pairs (and very few similar pairs) from contention, while possibly allowing some non-similar pairs to slip through.

For each stage of the classifier one or more features and associated threshold values for the feature(s) are sought. To err on the side of similarity, each false negative was weighted $\beta$ times the cost of a false positive.

In one working embodiment of the low bandwidth streaming video system and method each stage of the cascade is trained until the cascade's false positive rate is lowered by 40%. In other words, of all pairs of images that pass through the first stage, a maximum of 40% can have been marked as non-similar. After each successive stage the false positive (FP) rate must be at most 0.4 times the rate after the previous stage. At the same time, each stage is only allowed to lower its accuracy (1−false negative rate) by 98%. In other words, the first stage can only allow the rejected pairs to contain at most 2% that have been annotated as similar by the $L_2$ norm test. The accuracy can drop by 98% each stage thereafter.

The cascade is stopped when a desired false positive rate is met or there is no more improvement.

The low bandwidth video streaming system and method has many advantages over other video transmission and coding systems. For instance, the low bandwidth streaming video system and method leverages the fact that in video conferencing or similar applications one is always seeing more or less the same thing. Unlike long-term memory motion compensated approaches, the images in the databases of the low bandwidth streaming video system are not limited to the frames in the immediate past. Conceptually the databases consist of the images that best represent the space of all possible facial appearances. In experiments, it was found that over 50% of the blocks have their best matches in the frames that are more than 50 frames away in the past. Furthermore, through the fast similarity testing, the low bandwidth streaming video system and method can intelligently fill the database of images with a broad spectrum of possible facial features. Additionally, the low bandwidth streaming video system and method's looking at a single human face by subdividing the image into four regional layers (background, face, eyes, and mouth) and treating each as a separate problem to be re-composited at the receiving end makes for efficient use of storage and computational resources. The invention also balances the synthesized results between accuracy and consistency. For instance, it produces a consistent set of eyes that will not appear to have artifacts (although the inaccuracy might introduce semantic misinterpretations). Additionally, in contrast to video streaming methods that use PCA, the low bandwidth streaming video system only requires locating the face approximately, vice precisely as is required with PCA methods, which is a much easier task. The low bandwidth streaming video system achieves a good balance between taking advantage of model information and its practicality. The aforementioned features and advantages allow the low bandwidth video streaming system to operate in real time.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the invention will become better understood with regard to the following description, appended claims, and accompanying drawings where:

FIG. 7 shows that each classifier in a cascade classifier rejects non-similar images. Each stage thus acts on a smaller subset of possible pairs of images allowing only the best matches to pass all the way through.

DETAILED DESCRIPTION OF THE PREFERRED EMBODIMENTS

In the following description of the preferred embodiments of the present invention, reference is made to the accompanying drawings that form a part hereof, and in which is shown by way of illustration specific embodiments in which the invention may be practiced. It is understood that other embodiments may be utilized and structural changes may be made without departing from the scope of the present invention.

1.0 Exemplary Operating Environment

Figure 1:
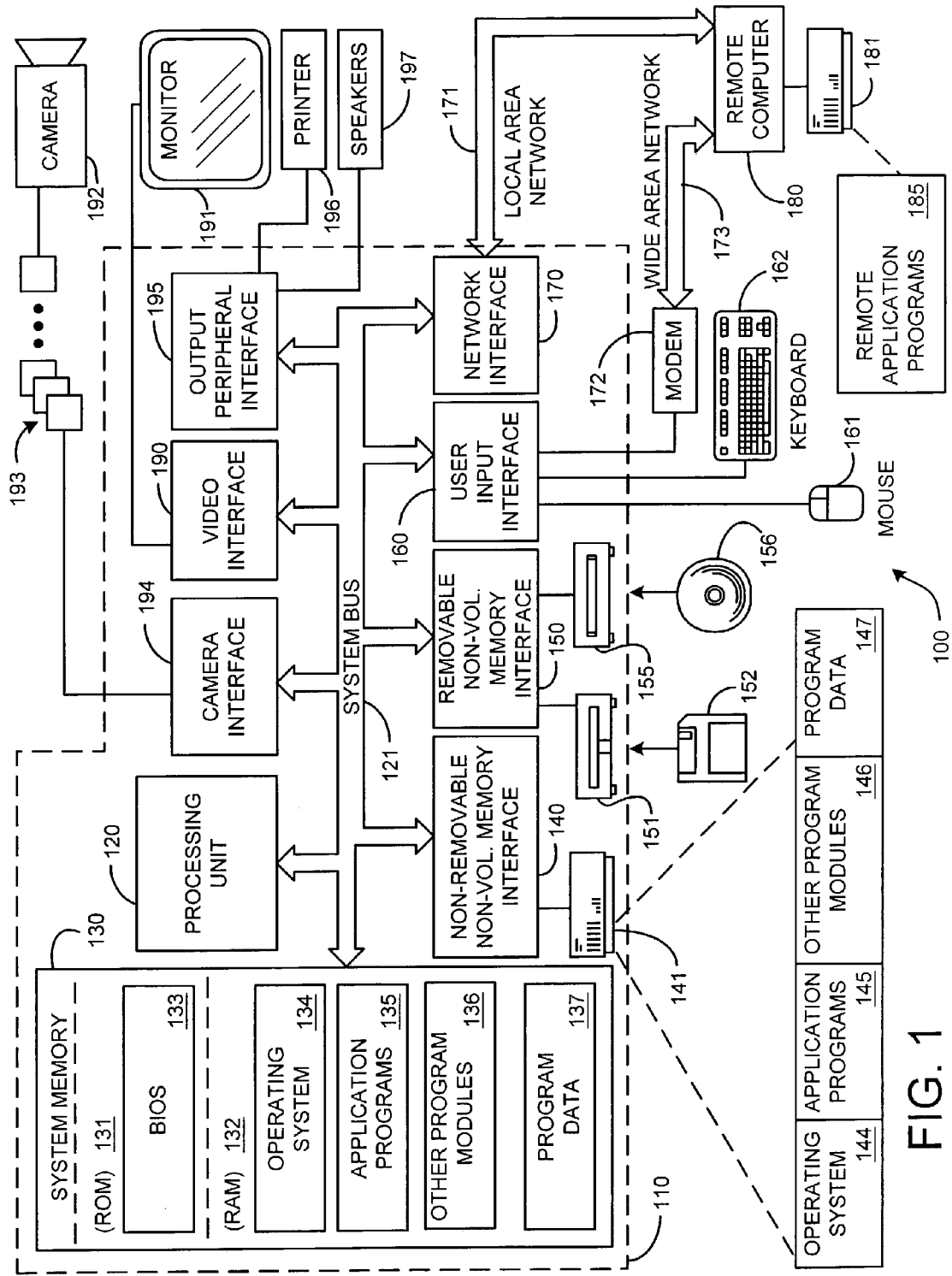
FIG. 1 is a diagram depicting a general purpose computing device constituting an exemplary system for implementing the invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through anon-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as an input device to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

2.0 A System and Method for Low Bandwidth Video Streaming for Face-to-Face Video Conferencing.

2.1 General Overview

The low bandwidth video streaming system and method according to the invention addresses the bandwidth problem for transmitting a video stream of a single face. However, the invention could be extended to transmitting a video stream of multiple faces by applying the technique to each face separately. It is assumed that both the sending and receiving devices have both fast processing and reasonably large storage capacities and that the camera taking the images of the person talking is static. It is also assumed that a conversation continues for many seconds to allow images transmitted in the first seconds of the conversation to aid in the transmission of the remaining video stream. The low bandwidth video streaming system and method according to the invention employs and builds on technologies from machine learning, texture synthesis, and video compression methods. After the first few seconds of a conversation bandwidth rates of approximately 100 bytes per frame can be achieved. This is less than a slow 28.8 kbps modem line even at 30 fps. Processing latency in one working embodiment of the invention is approximately one quarter second, which can be lowered considerably.

Figure 2A:
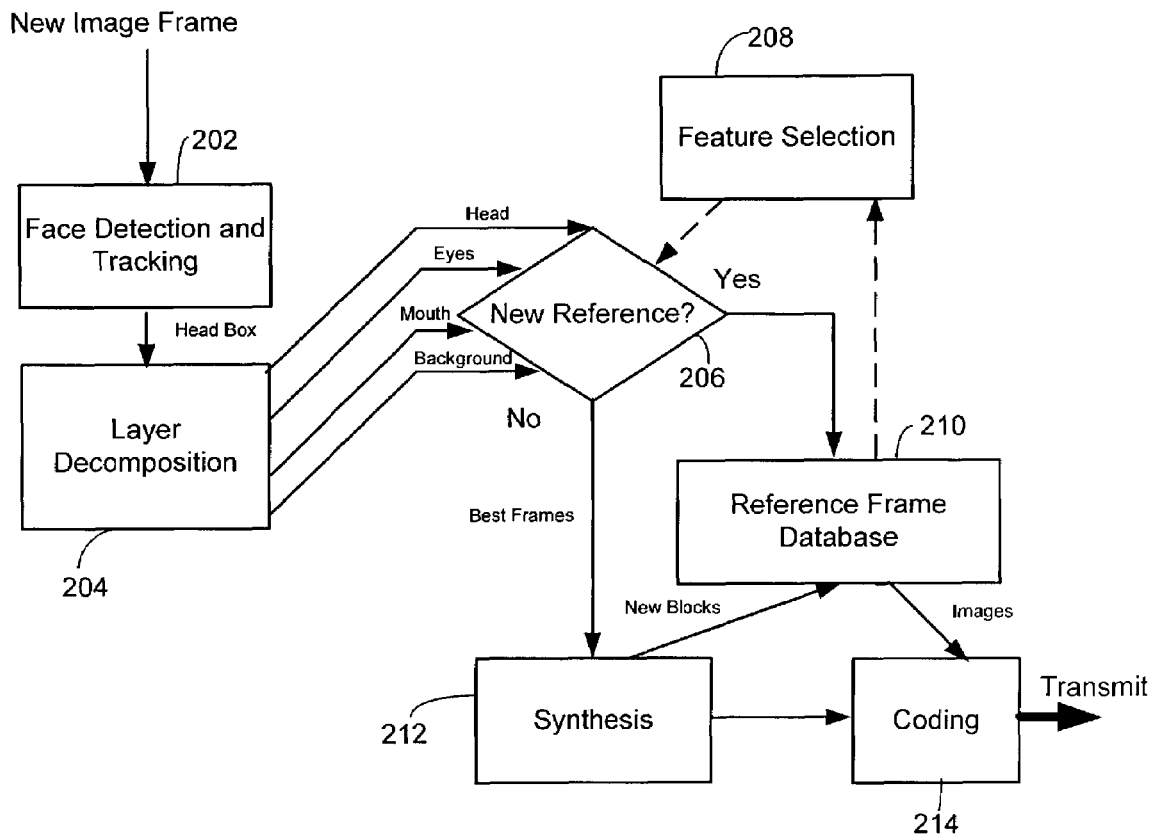
FIG. 2A is a diagram depicting the architecture of the sender of the low bandwidth video streaming system and method according to the invention.
Figure 2B:
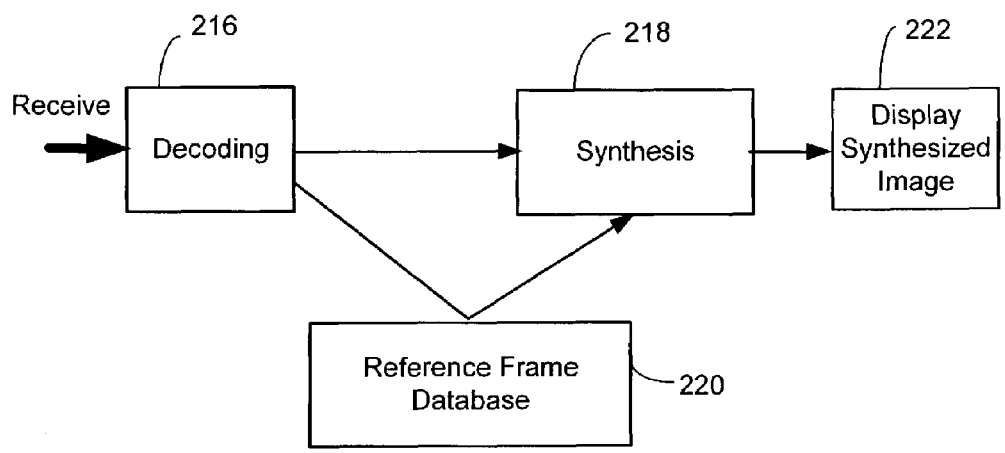
FIG. 2B is a diagram depicting the architecture of the receiver of the low bandwidth video streaming system and method according to the invention.

The overall architecture of the system is shown in FIG. 2A and FIG. 2B. FIG. 2A depicts the modules of the sender, whose operation and inter-relations will be described in detail in the following paragraphs. The sender's modules include a face detection and tracking module 202 which detects a face in an input image. A layer decomposition module 204 decomposes the detected face into regional sub-image layers. These sub-image layers are examined by an evaluation module 206 to determine if each of the regional sub-image layers is new, or already present in a reference frame database 210 by comparing them to sub-images in the sender's reference frame database. This comparison may be made using features selected in a feature selection module 208, which typically selects the features to be used offline. The best matching frames to the regional sub-image layers in the reference frame database 210 are sent to a synthesis module 212 where blocks from the best matches to the original input image are synthesized into an image most closely resembling the original input image. If no matches are found, the sub-image layer in question can be added to the reference frame database. The new images and the instructions on how to synthesize the image are sent to a receiver after these are encoded in an encoding module 214.

FIG. 2B depicts the modules of the receiver. The receiver receives the data, decodes it in its respective decoding module 216, draws the respective images from its receiver reference frame database 220, and synthesizes the image that resembles the original image input at the sender according to the sender's synthesis instructions via its synthesis module 218. The synthesized image is then displayed on a display 222 at the receiver.

Figure 3A:
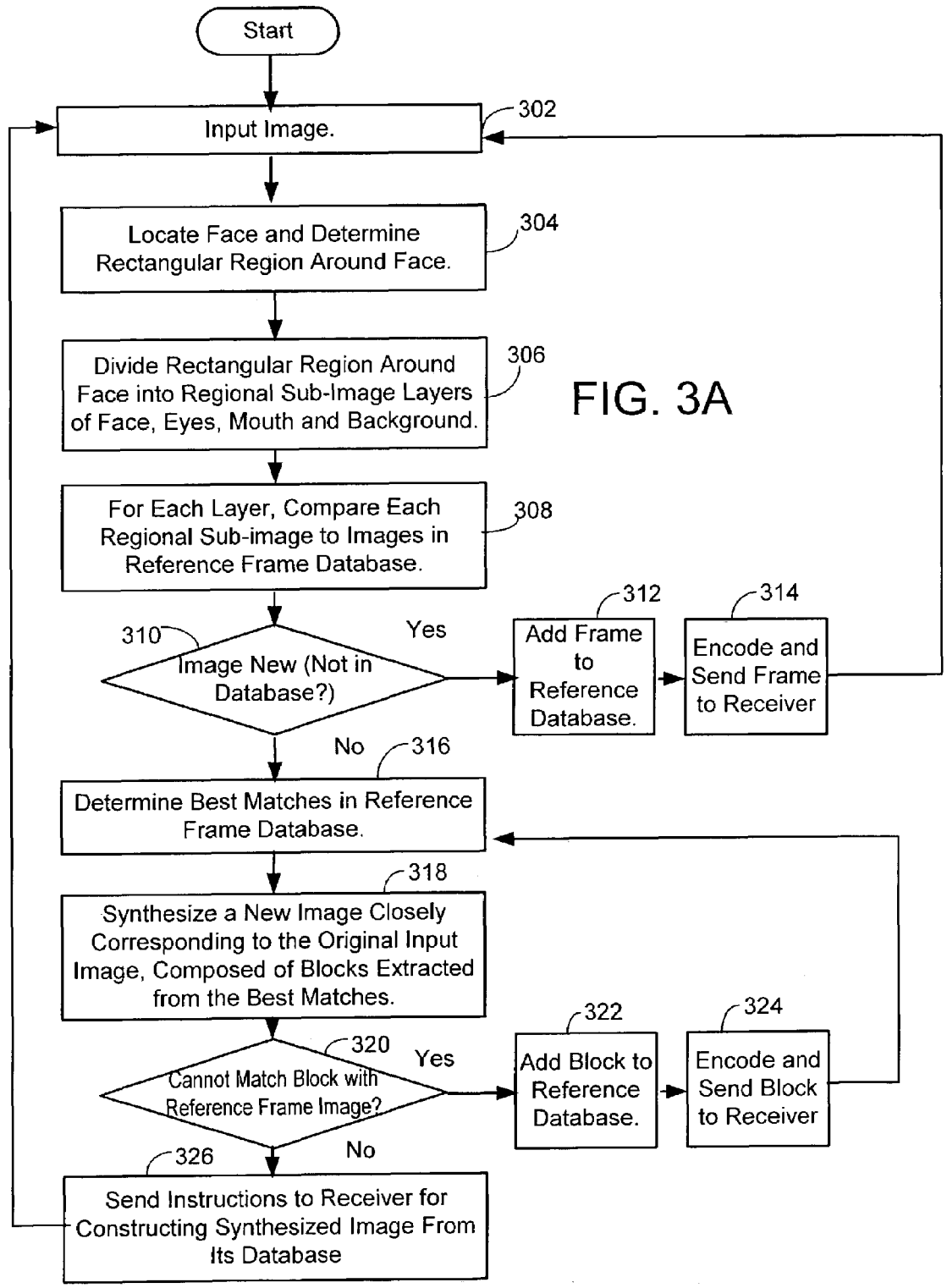
FIG. 3A is a flow diagram depicting the general process actions of the sender of the low bandwidth video streaming system and method according to the invention.
Figure 3B:
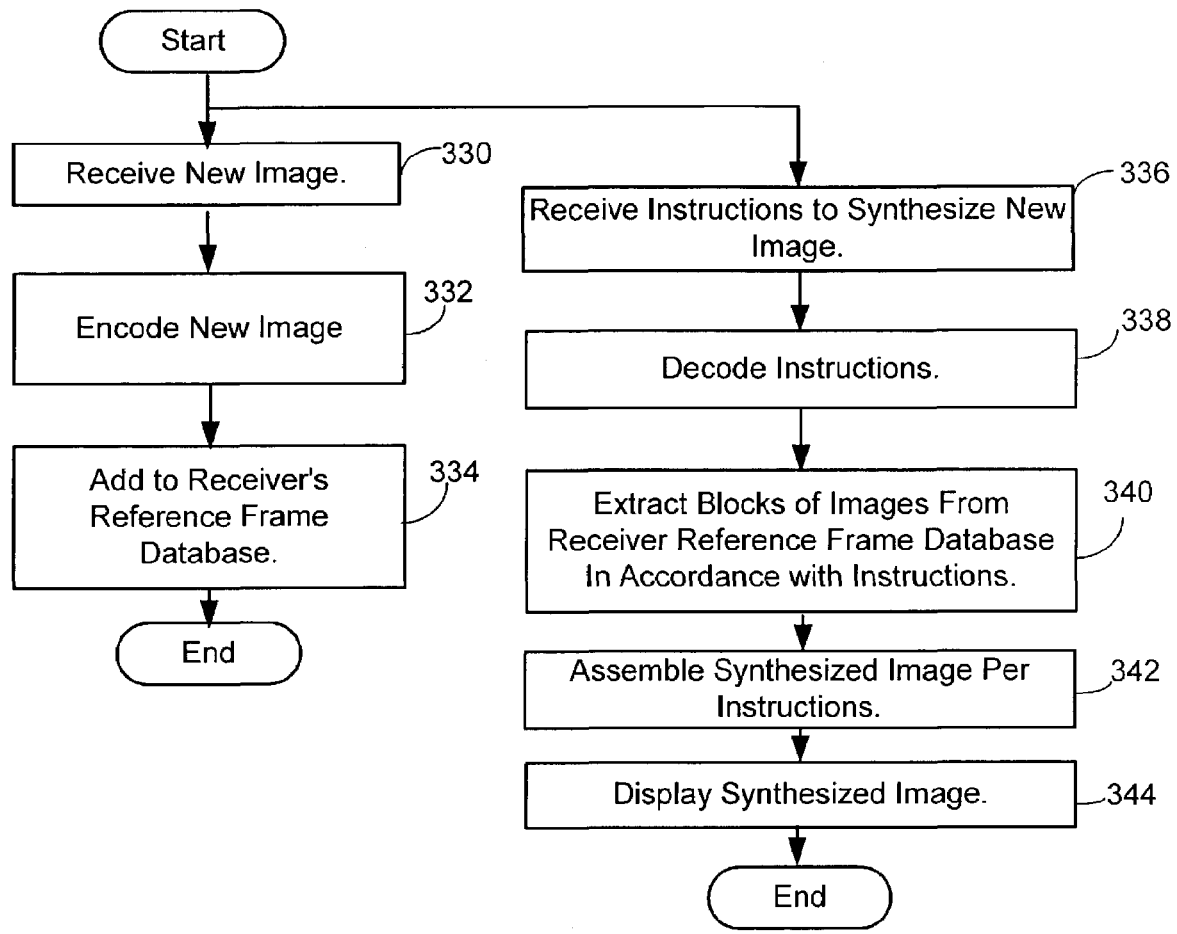
FIG. 3B is a flow diagram depicting the general process actions of the receiver of the low bandwidth video streaming system and method according to the invention.

The general architecture of the invention having been described, FIGS. 3A and 3B depict flow diagrams detailing the process actions of how the low bandwidth video streaming system works. As shown in FIG. 3, as each image enters the system from a camera (process action 302), the system finds the face (process action 304) and determines a rectangular "Head Box" surrounding the face.

The image is then divided into four regional sub-image layers as shown in process action 306. These sub-images include the face inside the Head Box, a rectangular region encompassing the eyes, and a rectangular region encompassing the mouth, set at predetermined positions based on predetermined ratios. The background outside the Head Box is also considered as a separate sub-image region layer. Each of the three regional sub-images Head (minus eyes and mouth), Eyes, and Mouth that are separate from the background are processed as separate layers from this point onward and are recomposited at the receiver end after transmission. The background layer is encoded only upon initialization and updated very infrequently because it is not expected to change often. In one embodiment of the invention, the head, eyes and mouth layers are coded using a multi-reference frame prediction with different quality control. In this embodiment, it is assumed that different sub-image region layers have different perceptual importance. From most important to least important the four layers are ranked as follows: mouth, eyes, head and background. The more important a layer is, the better the quality should be. A sum of the absolute difference (SAD) of the pixel values is used as a quality measure between the synthesized frame and the original frame in one embodiment of the invention. Thus, an important layer such as the mouth is encoded with the smallest reconstructed SAD.

Once the face is located and divided into regional sub-image layers, each sub-image of the input image is then quickly compared to all previously saved sub-images, which are stored in a sender reference frame database, based on features that were selected using a feature selection classifier, as shown in process action 308. If a sub-image is determined to be new, it is added to the sender reference frame database (process action 310–312) and transmitted to the receiver (typically after encoding) (process action 314). The receiver then receives the message (process action 330) decodes the message (process action 332) if necessary and saves the sub-image in its own reference frame database (process action 334).

If instead of finding that the image is new, one or more possible matches in the sender's reference frame database are found to the input image (process action 316), these are forwarded to the synthesis module that uses a block-based texture synthesis methodology to construct an image closely resembling the original input image from blocks found in the closely matching sub-images from the database, as shown in process action 318. Optionally, if the synthesis module cannot match a particular block (process action 320), the original block may also be added to the sender's reference frame database (process action 322) and transmitted from the sender to the receiver (process action 324) to be added to the receiver's database. The coded instructions are then sent to the receiver for constructing the image closely resembling the original input image from its own reference frame database that matches the sender's (process action 326). The synthesis instructions include a pointer to the block in the receiver's reference frame database that are to be used and the pixel location offset from where the block is to start.

When the receiver receives a message containing synthesis instructions, as shown in process action 336, the receiver decodes the instructions if necessary (process action 338), extracts the blocks of images from the database per the instructions (process action 340) and then assembles the synthesized image (process action 342). The assembled synthesized image is then displayed at the receiver (process action 344).

Since the synthesis is based on previously saved frames, the early part of the teleconference will require relatively more frames to be sent. Thus, either a higher bit rate or a lower frame rate is needed compared to later in the conversation. As the conversation progresses few, if any, new frames are sent and added to the database resulting in a very low bit rate at high frame rates.

Several of the aforementioned aspects of the system will now be discussed in more detail in the following paragraphs.

2.2 Face Detection and Tracking

The first task addressed by the system is to find the face in the incoming image and determine for each component (face, eyes, mouth) if they are new. It is assumed there is exactly one face in the image and it occupies a significant fraction of the image. For each frame, the face detection system returns a rectangular box indicating where the face is. Although any conventional face detection method can be used for this task, in one embodiment of the low bandwidth video streaming system and method according to the invention, a face detection method by Voila and Jones [1] is employed to provide the rectangle or Head Box closely surrounding the head in the input image. Voila and Jones described a machine learning approach for visual object detection, which is capable of processing images extremely rapidly and achieving high detection rates. A new image representation called the "Integral Image" was introduced which allows the features used in classification to be computed very quickly. Voila and Jones combined increasingly more complex classifiers in a "cascade" which allows background regions of the image to be quickly discarded while spending more computation on promising object-like regions. The cascade can provide statistical guarantees that discarded regions are unlikely to contain the object of interest. Voila and Jones used this information to create a face detector which classified images as containing a face or not.

Whichever face detection method is used with the low bandwidth video streaming system and method of the invention, the face video is decomposed into multiple layers, where each layer is encoded independently. In one embodiment, the face detection algorithm in [1] is used to locate a rectangular box containing the face. For real-time detection, the detector scans only in the neighborhood of the face location in the previous frame. After the face or Head box is found, the eyes and mouth areas are located based on their relative ratio in the Head Box. The precise facial feature locations are not crucial, thus making the face detection methodology used in the invention more robust than required by model-based coding.

Whatever face detection process is used, the parameters of the rectangle closely indicating the head position and size may change slightly from frame to frame due to random noise and small forward and backward movement of the head. Subsequent processing is performed to ensure that the boxes in each of the images have the same size. In one embodiment of the invention this is done by averaging the sizes of the first few frames, and using this rectangle size as the fixed rectangle sizes for all of the remaining frames that are processed. For each new frame, the rectangle returned by the face detector is scaled so that the new rectangle has the same size as the fixed rectangle. The indicated neighborhood (e.g., 16 pixels along each u and v direction) is then searched to find the position (with the fixed size) that best matches the face in the previous frame. The eyes and mouth are then cut from rectangular regions at fixed position within the face rectangle using known ratios based on a generic head model to estimate their positions.

2.3. Face Matching via Learned Features

The low bandwidth video streaming system and method can include an offline feature selection module to select the features to be used in determining whether the input image and the image in the reference frame database are similar. This feature selection module can optionally be combined with an on-line feature selection module to select the best features to determine whether an input image matches an image already stored in the image database of the sender or receiver. These modules are explained in greater detail below.

2.3.1 Offline Feature Selection

Given a face rectangle and associated eyes and mouth rectangles, the system determines for each component (face, eyes, mouth) if it is new. It is preferred that these determinations be very fast. One method employed in the low bandwidth video streaming system for comparing a new image to images in the existing databases builds on the work presented by Viola and Jones [1] for fast object detection. In this work, a set of features is defined by differences of rectangular regions in a summed area table [2] which they have named an integral image. For an image, I, with pixel $I_{uv}$, the corresponding pixel in the integral image $II_{uv}$ is equal to the sum of all pixels above (or below) and to the left (or right) of it.

$$II_{uv} = \Sigma_{i=0 \to u, j=0 \to v} I_{ij}$$

Figure 4:
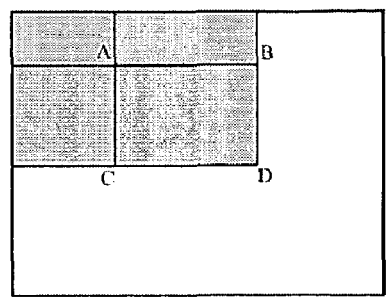
FIG. 4 depicts a rectangle ABCD which equals rectangles D+A−B−C in an integral image.
Figure 5:
FIG. 5 depicts an eye image and a corresponding integral image.
Figure 6:
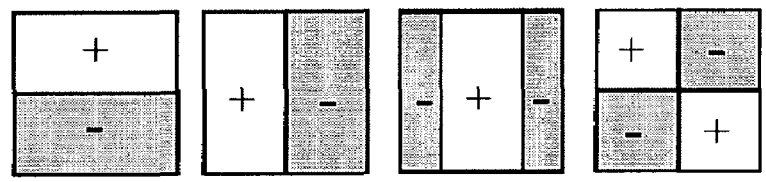
FIG. 6 depicts features that represent sums and differences of two, three, and four rectangles.

The integral image can be computed in a single pass through the image. It then allows the fast evaluation of the integral of any rectangle in the image by accessing and summing or differencing only four pixels. For example, referring to FIG. 4, the sum of all pixels in rectangle ABCD is equal to $II_D + II_A - II_B - II_C$. FIG. 5 shows an eye image and its corresponding integral image. The feature set defined by Viola and Jones includes sums and differences of two, three, and four adjacent rectangles, which can be evaluated from six, eight, and nine integral image pixel references respectively. FIG. 6 shows features that represent the sums and differences of two, three and four rectangles. The feature score of a particular feature, F, applied to an image, a, is simply F(a)=the sum of the white (+) regions minus the sum of the black (−) regions.

The set of all possible features of any size is very large. They represent an over-complete basis of Haar wavelet-like filters. The hypothesis is that the values of particular small subset of the features can be used to distinguish between (in the present case) a face and a non-face image. Viola and Jones describe a machine learning approach to find such a set of features. They present the classifier with a set of positive (faces) and negative (non-face) examples and determine the best features to be used for the classifier and threshold values for each feature. They leverage the fact that most rectangles in an image do not contain a face by training a cascaded set of face rejection classifiers, each of which can reject most non-faces and pass on only likely candidates for the next phase of the cascade. As discussed previously, this trained cascade classifier can be used in one embodiment of the invention for finding a face or Head Box in the input image.

However, the low bandwidth streaming video system according to the invention uses a similar classifier in a new manner to determine whether the current image (e.g., face or eyes or mouth) is sufficiently similar to an image previously stored in a database to be a candidate for the synthesis stage. This method requires some rethinking of the machine learning methodology. In the case of the low bandwidth streaming video system and method, the classifier cannot act on a single image alone (face vs. non-face) but must act on a pair of images to classify them as similar or non-similar. To do so, the score that a particular feature returns is altered to be the absolute difference between the unary feature scores on each of the pair of images under consideration, $$F(a,b) = |F(a) - F(b)|.$$

In addition, in Viola and Jones' work, the training set was carefully constructed and hand annotated. In the low bandwidth streaming video system and method, the classifier is trained automatically from video sequences. To do so, each pair of images is annotated as similar (or non-similar) based on the pixel luminance $L_2$ difference between them. More specifically, a sequence of training images is examined, and the $L_2$ difference between all pairs of images is annotated and recorded. The pairs of pixels are annotated to be similar if they are at least α standard deviations less different than the mean difference:

$$S(a,b) = 1 \text{ if } \|a-b\|_2 < \mu - \alpha\sigma, \ 0 \text{ otherwise}$$

where μ and σ are the mean and standard deviation of the $L_2$ distances between all pairs of images in a sequence from a single person. Training sets from multiple people sitting and talking in front of a camera with different lighting conditions were captured. A different μ and σ were determined for each person. A value of 1 was (somewhat arbitrarily) set for α after examining histograms of the aforementioned pixel luminance distances.

Figure 7:
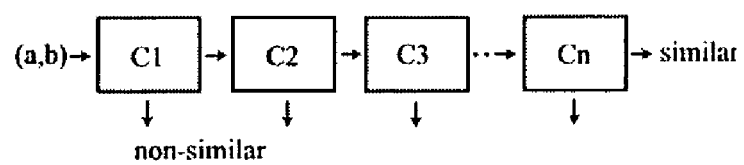

Given an α greater than one, one can (almost) be assured that most pairs will be marked as non-similar. This fact was used to construct an efficient classifier by training a cascade of classifiers, each of which is good at removing many non-similar pairs (and very few similar pairs) from contention, while possibly allowing some non-similar pairs to slip through. In other words, each stage of the cascade should be designed to err on the side of false positives over allowing false negatives. Taken together, the complete cascade should efficiently classify all pairs. FIG. 7 is a diagram depicting how each classifier in a cascade rejects non-similar images. Each stage thus acts on a smaller subset of possible pairs by allowing only the best matches to pass all the way through.

For each stage of the classifier one or more features and associated threshold values for the feature(s) are sought. To err on the side of similarity, each false negative was weighted β times the cost of a false positive.

There are a number of design choices as to how to train the classifier. The goal is for a previously unseen person to be able to sit down and use the system. The classifier must be able to quickly determine similarities between images within a single session rather than across sessions with different people, however it should not be person specific. The questions which relate to classifier design include: Should each classifier be trained from a collection of data from many people, or by merging training sessions from each individual? How many stages should the cascade contain? More specifically, how can one know when each stage is trained? Ideally each stage will find the minimum number of features to reject some fraction of non-similar pairs while incurring minimal error. What should the fraction be and what kind of error should be tolerated?

In other words, there are some parameters to be chosen, but most can be guided by intuition, empirical experience, and experience gleaned from the literature. These issues have been explored. For the first question different combinations of training sets and merging sets have been used. For the second question an AdaBoosting method outlined by Viola and Jones is relied on to train each stage of the cascade.

In one working embodiment of the low bandwidth streaming video system and method each stage of the cascade is trained until the cascade's false positive rate is lowered by 40%. In other words, of all pairs of images that pass through the first stage, a maximum of 40% can have been marked as non-similar. After each successive stage the false positive (FP) rate must be at most 0.4 times the rate after the previous stage. At the same time, each stage is only allowed to lower its accuracy (1−false negative rate) by 98%. In other words, the first stage can only allow the rejected pairs to contain at most 2% that have been annotated as similar by the $L_2$ norm test. The accuracy can drop by 98% each stage thereafter.

The cascade is stopped when a desired false positive rate is met or there is no more improvement.

2.3.2 On-Line Feature Selection Module

One embodiment of the invention includes an "on-line" portion to the feature training, in addition to the offline feature-training module. The reason for on-line training is that each new person, who is not in the offline training database, may need new features. The on-line training is a remedy for this problem. The basic concept is to perform training on the fly (i.e., during the video conferencing). A complete training based on all possible features with the new video data at run time will be too slow for real-time video processing. Instead of using all possible features, the on-line feature-training module pre-selects a small number of features found by training for each person in the training data. The union of these features is then used as the possible set during online training. A small selection of frames during the beginning of the online session is then used to train a new classifier for the current session. One embodiment of the low bandwidth streaming video system and method was tested resulting in a 2 layered cascade classifier, giving approximately 94% accuracy rate and 3% false positive for each layer.

2.3.3 Exemplary Feature Selection Procedure.

A specific procedure used for training a classifier cascade to determine the best features to use in matching an input image to a database image is shown below.

Given N pairs (P) of images and their similarity (S=0,1 for non-similar vs. similar), the ith pair and similarity is denoted ($P_i$,$S_i$)

Initialize each pair's weight, $$w_{i,0} = \frac{1}{N_S} \text{ or } \frac{1}{N_{NS}}$$

depending on the pair's similarity, and $N_S$, $N_{NS}$=number of pairs annotated similar and non-similar.

For as many features $F_j$ as needed
1. Normalize the weights to sum to 1.
2. For all possible features $F_j$, find a threshold $T_j$ that minimizes the misclassifications=βFN+FP. The false negatives (FN) are penalized more than false positives (FP) by a factor of β=5. For each pair $F_j(P_i)$=1 (similar) if $F_j$ returns a score with absolute value less than $T_j$, or 0 otherwise.
3. An error, $e_j$ is defined to be $e_j=\Sigma_i w_{ij}|F_j(P_i)-S_i|$. Given all possible ($F_j$,$T_j$) choose the one that minimizes $e_j$.
4. Set the voting weight of $F_j$ to be $W_j$=log [(1−$e_j$)/$e_j$]
5. Sum the votes for each pair to classify it V=$\Sigma_j W_j F_j$(P)/$\Sigma_j W_j$
6. If V>τ then P is marked as similar, otherwise non-similar. τ is set to 0.5 or is lowered to allow more pairs to be marked similar until the accuracy test (0.98 times as accurate as the previous stage) is passed.
7. If the chosen feature(s) pass the FP test (0.4 times lower % false positives) go on to the next stage of the cascade, otherwise
8. Reset all the weights to decrease the importance of the pairs that were properly classified $w_{ij+1}=w_{ij}[e_j/(1-e_j)]$. Weights of misclassified pairs remain unchanged (until normalization in step 1).
9. Go to 1 and choose an additional feature for this stage of the cascade.

New classifiers are added to the cascade until either a given maximum false positive rate is achieved or adding a new classifier is determined to not help (i.e., when all features are tested and none help achieve the goal). In a tested embodiment it was found that about 5 classifiers suffice in achieving lass that a 2% false positive rate.

2.3.4 Determining Similarity/Non-Similarity

Figure 8:
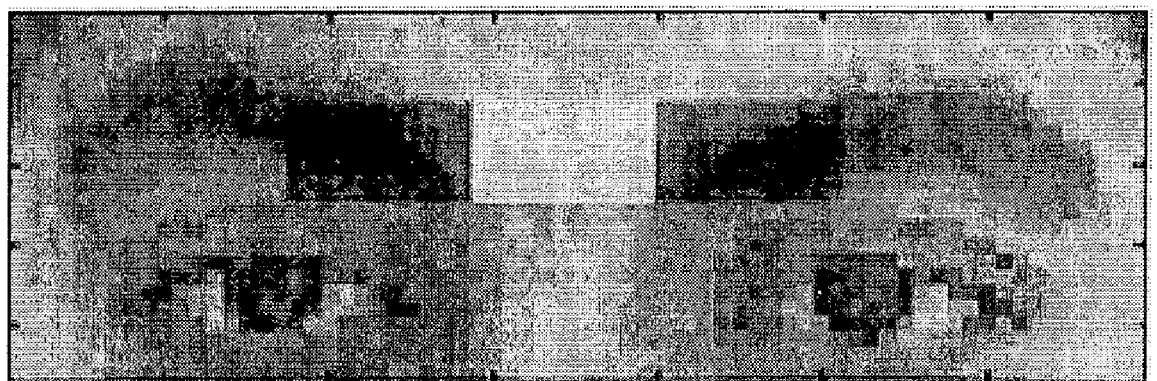
FIG. 8 shows that a first feature for eyes helps locate a bright bar between a pair of eyes. The first two features found for a mouth help locate and measure the relative shape of a mouth.
Figure 8:
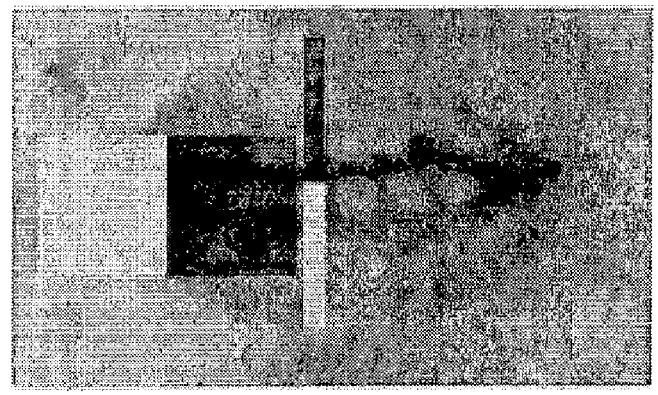

Once the cascade is trained and the features and their thresholds and voting weights are set, new image pairs can be evaluated as similar or non-similar extremely efficiently. FIG. 8 depicts how a first feature for eyes helps to locate a bright bar between a pair of eyes. The first two features found for a mouth help to locate and measure the relative shape of the mouth. For images that are inserted in the reference frame database, all the unary feature scores are stored.

Figure 9:
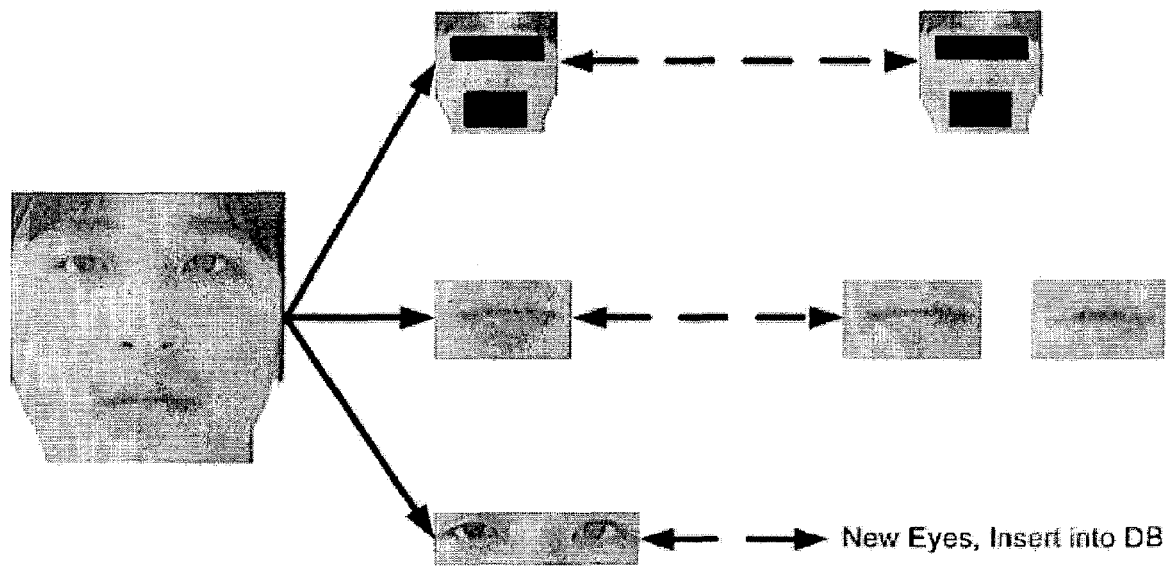
FIG. 9 depicts how from an input face image one matching face and two matching mouths are found. The eyes are new and are thus sent "as is" to a receiver and added to a database at the receiver.

The low bandwidth streaming video system then only needs to determine the feature scores for the new image and compute the difference from the feature scores of the database image under consideration for each feature. This difference is then compared to the threshold for that feature to determine whether the two images are different or similar for this feature. FIG. 9 shows how from an input image of a face, one matching face and two matching mouths are found. The eyes are new and are thus sent as is and added to the database.

2.4 Synthesis of New Faces from Saved Faces

Once the fast matching is in place using the trained classifier, there are two paths a new incoming sub-image (e.g., head, eyes, or mouth) might take in FIG. 2. If the matching process determines the image is not similar to any in the sender's reference database, the image is simply added to the database, encoded (e.g., as a JPEG or other suitable encoding scheme), and transmitted. The receiver simply decodes it, optionally displays it, and adds it to the receiver database. In the sender's database, the images may be stored in a three level multi-resolution hierarchy of downsampled images. The multi-resolution hierarchies are computed once, and are used for fast block matching purpose.

Figure 10:
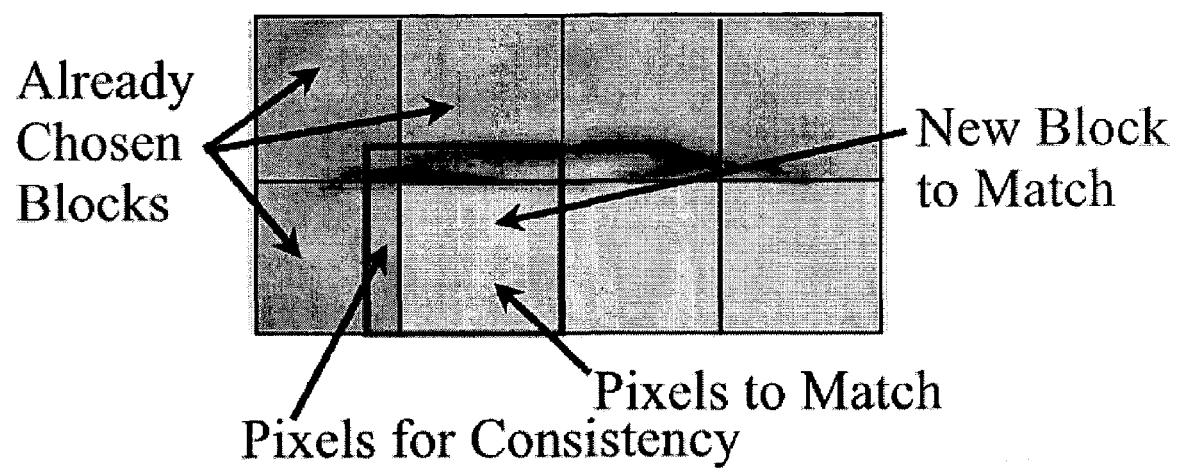
FIG. 10 depicts how each possible block is matched against a combination of pixels from the new image and from already chosen blocks.

If similar images are found in the database, then the indices of the top scoring images (in one embodiment four images are designated as top images) are sent to the module responsible for synthesizing the new image from the database images. The synthesis process follows a block based texture synthesis methodology. For each pixel block of the image to be synthesized, the low bandwidth streaming video system and method searches each of the similar images from the database for a closest matching block. As shown in FIG. 10, each possible block is matched against a combination of pixels from the new block of the image to be synthesized and nearby pixels from already chosen blocks. Notice that during matching each block is extended so that it overlaps slightly with its neighboring blocks. The purpose is to avoid potential discontinuities along the block boundaries. In one working embodiment of the invention, the pixel block size was chosen to be 16×16 pixels with two pixels from already chosen blocks above and to the left. Thus, the system searches for a best matching 18×18 block. The search is performed plus or minus a certain number of pixels from the corresponding location in the database images (±8 in one working embodiment of the invention). For efficiency, the search is performed ±2 pixels at each of the three levels of the hierarchy. This reduces the required pixel comparisons by approximately a factor of 10.

The "best" match is determined by the sum of squared differences between corresponding pixels. The final matching score is a weighted sum from pixels in the block to be matched plus pixels already chosen to enhance the consistency across block boundaries. Adjusting the weights between the two types of pixels considered allows the low bandwidth video streaming system and method to find solutions that balance accuracy and consistency across block boundaries. If the weights for the new block are highly weighted then accuracy is rewarded. If, conversely, the pixels in the already chosen blocks are highly weighted, then consistency is rewarded. The ratio of weights of each can be adjusted differently between eyes, mouth, and head. One might hypothesize that accuracy will be more important in the mouth region but consistency will be more important in the eye region.

Once the best matches are selected, the information needed to reconstruct the new image is encoded and sent to the receiver. This includes the list of similar images in the database to draw from and, for each block, which of these images to use and the (Δu, Δv) offset from which to pull the block. The receiver simply unpacks the information and assembles the synthesized image for display.

The synthesized image will, of course, not exactly match the incoming image. One could encode the residual and transmit this but in tested embodiments no need to do this has been found. If the residual is found to be too large, then the "similar" images selected were probably not good enough. In this case the system can fall back and declare the new image to be a new reference image, and simply encode and transmit the original image to be used and added to the database. This decision can also be made on a block-by-block basis.

Figure 11:
FIG. 11 shows a comparison of original and synthesized frames. The database contains 10 faces, 24 eyes, and 200 mouths. Some minor blocking artifacts can be seen particularly when the face, eyes or mouth were in motion when the image was taken.

FIG. 11 shows a comparison of original and synthesized frames. The database contained 10 faces, 24 eyes and 200 mouths. Some minor blocking artifacts can be seen particularly when in motion.

2.5 Results of Exemplary Working Embodiments

The following sections describe the results of exemplary working embodiments of the invention. The results using the feature selection procedure are initially described. Overall results are presented and a comparison to another video coding schema is made.

2.5.1 Feature Selection Results.

In one embodiment, the previously described feature selection system and method of the invention was tested on data from a single person consisting of about 9000 pairs of images. Half of these pairs of images were used for training the classifier, white the other half were reserved for testing. A single classifier consisting of 100 features was first trained. This resulted in 94% classification accuracy and 1.7% false positives.

Figure 12:
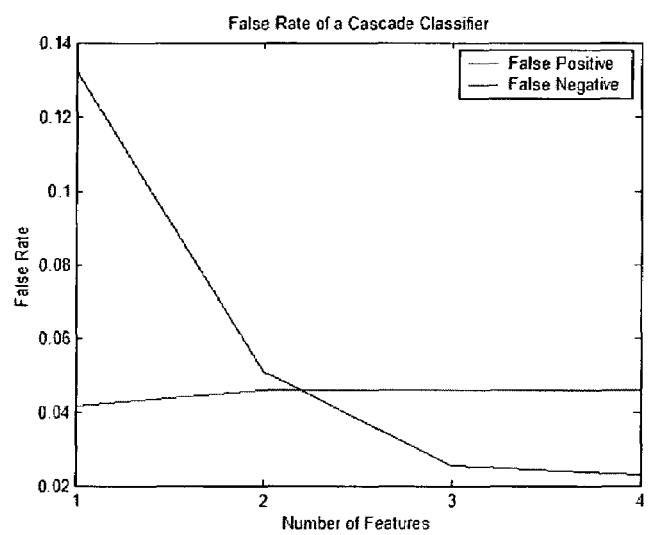
FIG. 12 shows how the false positive rate of a classifier drops when an increased number of features is used.

A cascaded-classifier produced 96.2% classification accuracy and 2.1% false positives. This classifier is extremely simple with three layers of only 1, 1 and 2 features respectively. The result is comparable to a single classifier with many more features. FIG. 12 shows how the false positive rate of a cascade classifier drops as more features are used.

One embodiment of the low bandwidth streaming video system and method was then trained and tested on a 10 person database with over 50000 pairs of images, again using half of the images as training data and half as testing data. The accuracy of a cascaded classifier is 91.5% for eyes, 93.7% for mouth and 93.4% for face without eyes and mouth. The false positives are 3.6% for eyes, 2.4% for mouth and 2.6% for face.

The low bandwidth streaming video system and method was also tested using the same training data, but with images of a new, not seen before, 11$^{th}$ person. The accuracy dropped a little with the result of 89.2% for eyes, 90.9% for mouth and 91.2% for face, but the false positive rate rose dramatically to 9.2% for eyes, 6.6% for mouth and 8.3% for face. This result could be improved by with more training data.

2.5.2 Total System Results

Figure 13:
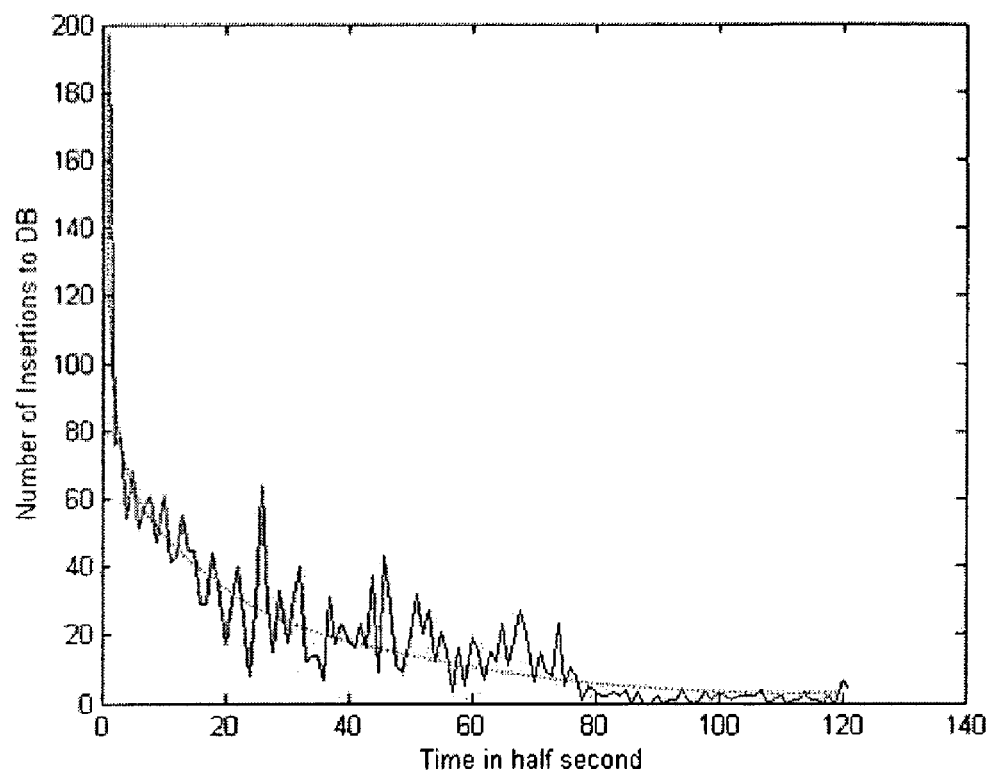
FIG. 13 shows the number of insertions into a database each half second.

The experimental results on two video sequences of one embodiment of the low bandwidth streaming video system and method. The first one is a broadcast sequence as seen in FIG. 11. It is 35 seconds long and 30 frames per second. The head image size itself is 180×240 pixels. The average bit rate of the encoded stream using the low bandwidth video streaming system is about 24 kbits per second at 30 frames per second. As expected, the bit rate is much higher at the beginning of the sequence as more insertions are needed into the database, as shown in FIG. 13.

Figure 14:
FIG. 14 depicts a video conference sequence.

The second example, seen in FIG. 14, is a simulation of a video conferencing scenario, where a person in his office talks and looks around with a camera fixed on the monitor. The frame rate is 15 frames per second. The overall image resolution is 640×480 pixels. However, this embodiment of the low bandwidth streaming video system and method only encodes the face region which is about 128×144. The encoded region was pasted on the original video sequence. Notice that the non-face region is mostly static and it should have much higher compression ratio than the face region. For this sequence, this working embodiment of the system results in an average bit rate of 30 kb/second. The average peak signal to noise ratio (PSNR) is 32.5 dB. One can see that the eyes and mouths are very sharp in the reconstructed video sequence. However, there are some noticeable blocking artifacts on the faces.

It is believed that adding spatial and temporal coherence into the matching score can eliminate most of the block artifacts. Spatial coherence has been used in the block-based texture synthesis methods to reduce the blocking artifacts in static images. Both the spatial and temporal coherence can be used to significantly reduce the blocking artifacts in the reconstructed video sequence.

2.5.2 Comparison to JVT Coder

Figure 15:
FIG. 15 depicts a snapshot of an input video frame.

In this section, preliminary experimental results are compared to a JVT coder from [3]. This embodiment of the invention was implemented on a PC with a Pentium 4 2.0 GHz processor and 512 MB memory. The system used an IEEE 1394 camera, which can capture frames of resolution 640×480 pixels at up to 15 frames per second. FIG. 15 shows a snapshot of an input video frame. The red boxes indicate the layer decomposition result from the face detection where the size of the face box (the largest rectangle) is about 200×230 (notice that this number changes from frame to frame). The face region was cropped out and the cropped video sequences were used to measure the performance of the system and to compare with a benchmark coder. The reason that the comparison did not use a standard test sequence is because the low bandwidth video streaming system and method benefits significantly from a longer face video sequence, which lasts several minutes and includes thousands of frames (1500 frames in the test video). This embodiment runs at approximately 5 to 9 frames per second (fps) depending on the size of the face in the video frame.

The benchmark coder is the JVT reference software JM 4.2 obtained from [11]. It is a joint effort between ISO MPEG and ITU H.26x after the successful H.264 development, and represents the state-of-the-art in low bit rate video coding. The average decoding peak signal-to-noise ratio (PSNR) of the face area was used to measure the compression performance between the low bandwidth video streaming system and method and the JVT coder. Other comparison metrics include the coding bit-rate, and the encoding time of one frame. The performance of the low bandwidth video streaming system and method was compared with that of the JVT coder. Because low bandwidth video streaming system and method bears similarity to the long-term memory prediction mode of H.264/JVT, the mode is enabled with parameters Number of Reference Frames=5
Additional Reference Frames=19

TABLE 1

PERFORMANCE COMPARISON OF THE LOW BANDWIDTH VIDEO STREAMING SYSTEM AND METHOD TO THE JVT CODER

| Codec | Low Bandwidth Video Streaming System | JVT Coder |
| --- | --- | --- |
| Y PSNR (dB) | 32.1 | 32.2 |
| U PSNR (dB) | 43.2 | 41.4 |
| V PSNR (dB) | 39.3 | 39.8 |
| Bitrate at 15 Hz (Kbit/s) | 19.1 | 19.8 |
| Coding time of One Frame (ms) | 153 | 1370 |

Figure 16:
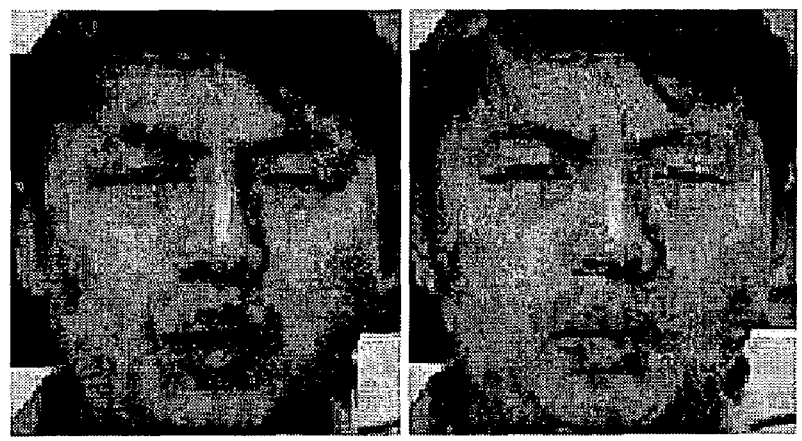
FIG. 16 shows a frame reconstructed by a JVC coder and by the low bandwidth video streaming system and method according to the invention, respectively.

Only one block size 8×8 is used in motion estimation and compensation to speed up the JVT coder. Moreover, only the first frame is encoded as I frame, and the rest frames are encoded as P frames. The comparison results between the low bandwidth video streaming system and method and the JVT coder are shown in Table 1. It is observed that the low bandwidth video streaming system and method achieves relatively the same PSNR performance compared to the JVT coder with one tenth of the computational complexity. FIG. 16 shows one of the reconstructed frames by JVT and the low bandwidth video streaming system and method, respectively. Even though the PSNR value of the low bandwidth video streaming system and method is slightly lower, it provides a far superior facial reconstruction. Compared to the JVT reconstructed frame, far more facial details are preserved, such as wrinkles in eyes and mouth area.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

1. Viola, P. & Jones, M., Robust real-time object detection, International workshop on statistical and computational theories of vision, 2001.
2. Crow, F. C., "Summed-Area Tables for Texture Mapping", Proceedings of SIGGRAPH '84, Computer Graphics, Vol. 18, No. 3, July 1984, pages 207–212.
3. H.26L codec reference software, "ftp://tfp.imtc-files.org/jvt-experts."

Wherefore, what is claimed is:

1. A computer-implemented process for low bandwidth transmission of images of a person talking, comprising the process actions of:

inputting a captured image of a person's face;
finding said face in said image;
dividing said face into sub-images corresponding to facial features;
comparing each sub-image to a set of previously saved images;
if a sub-image is determined to be new, adding said sub-image to said set of previously saved images;
sending said sub-images determined not to be in said set of previously saved images to a receiver with instructions for saving;
if a sub-image is determined to be similar to sub-image in said set of previously saved images,
   synthesizing a new image closely corresponding to the captured image of a person's face; and
   sending said receiver instructions for constructing said synthesized image from said set of saved images at said receiver.

2. The computer-implemented process of claim 1, further comprising the process actions of:

said receiver saving said sub-images determined not to be in said set of previously saved images to a set of saved images at said receiver; and
said receiver constructing a synthesized image resembling said captured input image from said set of images in said receiver set of saved images using said instructions.

3. The computer-implemented process of claim 1 wherein said process action of dividing said face into sub-images corresponding to facial features, comprises dividing said face into at least one of:

a sub-image encompassing eyes in the face;
a sub-image encompassing a mouth in the face;
a sub-image encompassing the face without the sub-images encompassing the eyes and the mouth; and a background sub-image not including the face.

4. The computer-implemented process of claim 3 further comprising the process action of saving each of said sub-images with an image quality dependent on the perceptual importance of said sub-image.

5. The computer-implemented process of claim 4 further comprising the process action of ranking each sub-image in order of mouth sub-image, eye sub-image, face sub-image without eyes and mouth, and background, respectively, in order of most important to least important.

6. The computer-implemented process of claim 4 wherein said image quality is defined as the sum of the absolute difference of the pixel values between the captured image and the synthesized image.

7. The computer-implemented process of claim 6 wherein the most important sub-image is created with the smallest sum of the absolute difference of the pixel values between the captured image and the synthesized image.

8. The computer-implemented process of claim 1 wherein the process action of comparing each sub-image to a set of previously saved images, further comprises comparing each sub-image based on at least one image feature.

9. The computer-implemented process of claim 8 further comprising the process action of calculating said at least one feature.

10. The computer-implemented process of claim 1 wherein the process action of comparing each sub-image to a set of previously saved images, comprises the process actions of:

calculating an integral image for said sub-image
   for each of said set of previously saved images in turn,
      calculating an integral image of said previously saved image;
      calculating a unary feature score for said integral image of said sub-image and a unary feature score for said integral image of said previously saved image;
      assigning the absolute difference of the feature scores between the sub-image and previously saved image as the feature score for the sub-image and previously saved image under consideration; and
      comparing said feature score to a threshold to determine whether or not the sub-image and previously saved image are similar or non-similar.

11. The computer-implemented process of claim 10 wherein said unary feature score of an integral image is the integral of the white regions minus the integral of the black regions of the integral image.

12. The computer-implemented process of claim 1 wherein the process action of comparing each sub-image to a set of previously saved images, further comprising the process action of:

constructing a classifier by training each of a plurality of cascaded classifier stages to identify non-similar image pairs and allow only similar pairs to pass on to the next classifier stage if present, wherein each classifier stage is designed to err on the side of false positives but to minimize false negatives.

13. The computer-implemented process of claim 12, further comprising the process action of:

using said trained classifier to identify non-similar and similar image pairs.

14. The computer-implemented process of claim 12 wherein the process action of constructing a classifier by training each of a plurality of cascaded classifier stages, comprises the process actions of:

determining whether pairs of training images are similar or non-similar using a pixel luminance difference technique;
   training each stage of the classifier in turn by,
      inputting pairs of said training images into the classifier as a whole,
      for each pair of training images input into the stage under consideration,
         choosing an arbitrary image feature;
         calculating a feature score for each image of the pair of images,
         taking the absolute difference of the feature scores of the pair of images;
         comparing the absolute difference of the feature scores to a threshold to determine if the images are similar or non-similar; and
         comparing the determination of whether the images are similar or non-similar using the feature scores to the determination of whether the images are similar or not based on pixel luminance differences to identify if the classifier stage determination is a false positive or a false negative, wherein a false positive is defined as the classifier stage determining the image pair is similar when the pixel luminance technique determined the image pair is non-similar, and wherein a false negative is defined as the classifier determining the image pair is non-similar when the pixel luminance technique determined the image pair is similar;
      once all training image pairs have been input,
         determining if the number of false positives is equal to or below a first prescribed acceptable percentage;
         determining if the number of false negative is equal to or below a second prescribed acceptable percentage;
         whenever the number of false positives is not equal to or below the first prescribed percentage or the number of false negatives is not equal to or below the second prescribed percentage, repeating the training process for the classifier stage under consideration using an additional arbitrary image feature; and
         whenever the number of false positives is equal to or below the first prescribed percentage and the number of false negatives is equal to or below the second prescribed percentage, training the next classifier stage in the cascade if there is one, and if not designating the classifier as trained.

15. The computer-implemented process of claim 14 wherein the process action for determining whether pairs of images are similar or non-similar using a pixel luminance difference technique, comprises the process actions of:

comparing pairs of training images on a pixel by pixel basis to determine pixel luminance difference;
   determining how many pairs of images have a specific pixel luminance difference for all possible pixel luminance differences;
   designating a threshold defining if a pair of images are similar or non-similar based on the distribution of the pixel luminance differences; and
   determining if each image pair is similar or non-similar by comparing said pixel luminance difference to said designated threshold.

16. The computer-implemented process of claim 15 wherein pairs of pixels are determined to be similar if they are at least a prescribed number of standard deviations less different than the mean difference of the luminance values between all pairs of images in a sequence from a single person's face.

17. The computer-implemented process of claim 12 wherein the process action of constructing a classifier by training each of a plurality of cascaded classifier stages, comprises the process actions of:
given N pairs (P) of images and their similarity (S=0,1 for non-similar vs. similar), the ith pair and similarity is denoted $(P_i, S_i)$,
initializing each pair's weight, $$w_{i,0} = \frac{1}{N_S} \text{ or } \frac{1}{N_{NS}}$$

depending on the pair's similarity, wherein $N_S$, $N_{NS}$=number of pairs annotated similar and non-similar;
for as many features $F_j$ as needed,
 (a) normalizing the weights to sum to 1;
 (b) for all possible features $F_j$, finding a threshold $T_j$ that minimizes the misclassifications =βFN+FP, wherein the false negatives (FN) are penalized more than false positives (FP) by a factor of β=5 and for each pair $F_j(P_i)$=1 (similar) if $F_j$ returns a score with absolute value less than $T_j$, or 0 otherwise;
 (c) for an error, $e_j$ defined to be $e_j = \Sigma_i w_{ij} |F_j(P_i) - S_i|$, given all possible $(F_j, T_j)$ choosing the one that minimizes $e_j$;
 (d) setting the voting weight of $F_j$ to be $W_j = \log[(1-e_j)/e_j]$;
 (e) summing the votes for each pair of images to classify it $V = \Sigma_j W_j F_j(P)/\Sigma_j W_j$;
 (f) if V>τ then marking P as similar, otherwise marking P as non-similar where τ is set to 0.5 or is lowered to allow more pairs to be marked similar until an accuracy test is passed;
 (g) if the chosen feature(s) pass the FP test going on to the next stage of the cascade, otherwise;
 (h) resetting all the weights to decrease the importance of the pairs that were properly classified $w_{ij+1} = w_{ij} [e_j/(1-e_j)]$ wherein the weights of misclassified pairs remain unchanged until normalization in process action (a);
 (i) going to process action (a) and choosing an additional feature for this stage of the cascade, until either a given maximum false positive rate is achieved or all features are tested.

18. The computer-implemented process of claim 17 wherein the accuracy test is 0.98 times as accurate as the previous stage; and wherein the FP test is 0.4 times lower the percentage of false positives.

19. The computer-implemented process of claim 12 wherein the process action of constructing a classifier is performed off-line.

20. The computer-implemented process of claim 12 wherein the process action of constructing a classifier is performed on-line while using said classifier to classify non-similar and similar image pairs.

21. The computer-implemented process of claim 20 wherein said process action of constructing a classifier uses less than the total set of possible features.

22. A system for transmitting and receiving a low bandwidth video stream, the system comprising:
a sender, comprising,
 a module for face detection and tracking module which detects a face in an original input image,
 a layer decomposition module that decomposes the detected face into regional sub-image layers,
 an evaluation module that examines the regional sub-image layers to determine if each of the regional sub-image layers is new, or already present in a sender reference frame database by comparing them to sub-images in the sender reference frame database, and if no matches are found, adding the sub-image layer in question to the sender reference frame database,
 a feature selection module that selects features to be used in comparing the regional sub-image layers to the sender's reference frame database,
 a synthesis module that receives the best matching images to the original input image in the reference frame database and wherein blocks from the best matches to the original input image are synthesized into an image most closely resembling the original input image, and
 an encoding and transmission module that encodes new images and the instructions on how to synthesize the image and sends them to a receiver; and
a receiver, comprising,
 a receiving and decoding module that receives and decodes said images and instructions sent from said sender;
 a synthesis module that draws the respective images from a receiver reference frame database and synthesizes the image that resembles the original image input at the sender according to the sender's synthesis instructions, and
 a display module that displays said synthesized image at the receiver.

23. A computer-readable medium having computer-executable instructions for transmitting a low bandwidth video stream, said computer executable instructions comprising:
inputting a captured image of a person's face;
finding said face in said image;
dividing said face into sub-images corresponding to facial features;
comparing each sub-image to a set of previously saved images;
if a sub-image is determined to be new, adding said new sub-image to said set of previously saved images;
sending said sub-images determined to be new to a receiver;
if a sub-image is determined to be similar to sub-image in said set of previously saved images,
 synthesizing a new image closely corresponding to the captured image of a person's face; and
 sending said receiver instructions for constructing a synthesized image from said set of saved images at said receiver.

24. The computer-readable medium of claim 23 wherein said instruction for dividing said face into sub-images corresponding to facial features, comprises sub-instructions for dividing said face into at least one of:
a sub-image encompassing eyes in the face;
a sub-image encompassing a mouth in the face;
a sub-image encompassing the face without the sub-images encompassing the eyes and the mouth; and
a background sub-image not including the face.

25. The computer-readable medium of claim 23 wherein the instruction for comparing each sub-image to a set of previously saved images, further comprises a sub-instruction for:
constructing a classifier by training each of a plurality of cascaded classifier stages to identify non-similar image pairs and allow only similar pairs to pass on to the next classifier stage if present, wherein each stage is designed to err on the side of false positives but minimize false negatives.

26. The computer-readable medium of claim 25 further comprising an instruction for using said trained plurality of cascaded classifier stages for determining whether a sub-image is similar to a previously saved image.

27. The computer-readable medium of claim 23 wherein the instructions for constructing a synthesized image from said set of saved images at said receiver comprise a pointer to an image in said receiver's set of previously saved images to be used.

28. The computer-readable medium of claim 27 wherein said instructions further comprise pixel offset information from which to extract said block from said previously saved image.

29. The computer-readable medium of claim 23 wherein the instruction for synthesizing a new image closely corresponding to the captured image of a person's face, comprises sub-instructions for:
  for all portions of the input captured image of a person's face under consideration,
    extracting at least one block from each image in the previously saved set of images that best matches one portion of the captured image of the person's face; and
    assembling said blocks into said synthesized image that resembles the input captured image of a person's face under consideration.

30. The computer-readable medium of claim 29 wherein the instruction for synthesizing a new image closely corresponding to the input captured image of a person's face, further comprises sub-instructions for:
  if a block cannot be found in an image in the previously saved set of images that matches one portion of the captured image of the person's face,
    adding said block to said set of previously saved set of images; and
    sending said block to a receiver to be added to said receiver's set of previously saved images.

31. The computer-readable medium of claim 23 wherein the instruction for finding said face in said image, further comprising an instruction for:
  extracting a rectangle closely indicating the face position and size.

32. The computer-readable medium of claim 31 wherein said rectangle changes slightly from input image to input image, and further comprising instructions to ensure said rectangle closely indicating the face position and size have the same size from one input image to the next.

33. The computer-readable medium of claim 32 wherein the instructions for ensuring said rectangle has the same size, comprises sub-instructions for:
  averaging the sizes of the rectangle in the first few input images;
  using said averaged rectangle size as the fixed rectangle size for all of the remaining input images that are processed; and
  scaling each rectangle extracted from each input image so that the newly extracted rectangle has the same size as the averaged rectangle size.

34. The computer-readable medium of claim 29 wherein sub-instruction for extracting at least one block from each image in the previously saved set of images that best matches one portion of the captured image of the person's face, further comprises sub-instructions for slightly extending each block so that it overlaps slightly with its neighboring blocks.

* * * * *